US010632567B2

(12) United States Patent
Sutcliffe

(10) Patent No.: US 10,632,567 B2
(45) Date of Patent: Apr. 28, 2020

(54) ADDITIVE MANUFACTURING APPARATUS AND METHODS

(71) Applicant: RENISHAW PLC, Wotton-under-Edge, Gloucestershire (GB)

(72) Inventor: Christopher John Sutcliffe, Liverpool (GB)

(73) Assignee: RENISHAW PLC, Wotton-under-Edge (GB)

( * ) Notice: Subject to any disclaimer, the term of this patent is extended or adjusted under 35 U.S.C. 154(b) by 444 days.

(21) Appl. No.: 15/517,626

(22) PCT Filed: Oct. 20, 2015

(86) PCT No.: PCT/EP2015/074261
§ 371 (c)(1),
(2) Date: Apr. 7, 2017

(87) PCT Pub. No.: WO2016/062714
PCT Pub. Date: Apr. 28, 2016

(65) Prior Publication Data
US 2017/0304945 A1    Oct. 26, 2017

(30) Foreign Application Priority Data

Oct. 20, 2014 (GB) .................................. 1418595.3

(51) Int. Cl.
*B23K 26/342* (2014.01)
*B22F 3/105* (2006.01)
(Continued)

(52) U.S. Cl.
CPC ........ *B23K 26/342* (2015.10); *B01D 53/8671* (2013.01); *B22F 3/1055* (2013.01);
(Continued)

(58) Field of Classification Search
None
See application file for complete search history.

(56) References Cited

U.S. PATENT DOCUMENTS 4,579,723 A * 4/1986 Weltmer ................ B01D 53/34
423/219
4,983,194 A * 1/1991 Hopkins ................. C01B 23/00
62/646
(Continued)

FOREIGN PATENT DOCUMENTS

CN    103990798 A    8/2014
JP    S59-107910 A    6/1984
(Continued)

OTHER PUBLICATIONS

Apr. 9, 2015 Search Report issued in British Patent Application No. 1418595.3.
(Continued)

*Primary Examiner* — Geoffrey S Evans
(74) *Attorney, Agent, or Firm* — Oliff PLC

(57) ABSTRACT

An additive manufacturing apparatus including a chamber, a build platform movable in the chamber such that layers of flowable material can be successively formed across the build platform, a unit for generating an energy beam for solidifying the flowable material, a scanning unit for directing the energy beam onto selected areas of each layer to solidify the material in the selected areas and a getter for absorbing oxygen, nitrogen and/or hydrogen from atmosphere in the chamber.

16 Claims, 2 Drawing Sheets

(51) Int. Cl.
*B33Y 10/00* (2015.01)
*B33Y 30/00* (2015.01)
*B29C 64/153* (2017.01)
*B33Y 40/00* (2020.01)
*B33Y 50/02* (2015.01)
*B23K 26/144* (2014.01)
*B01D 53/86* (2006.01)
*B23K 26/12* (2014.01)

(52) U.S. Cl.
CPC ............ *B23K 26/12* (2013.01); *B23K 26/144* (2015.10); *B29C 64/153* (2017.08); *B33Y 30/00* (2014.12); *B33Y 40/00* (2014.12); *B33Y 50/02* (2014.12); *B01D 2253/1122* (2013.01); *B01D 2253/1124* (2013.01); *B01D 2255/20761* (2013.01); *B01D 2257/104* (2013.01); *B22F 2003/1056* (2013.01); *B22F 2003/1059* (2013.01); *Y02P 10/295* (2015.11)

(56) References Cited

U.S. PATENT DOCUMENTS

| | | | |
|---|---|---|---|
| 5,876,767 A | 3/1999 | Mattes et al. | |
| 5,902,561 A * | 5/1999 | Carrea | C01B 21/0483 423/210 |
| 6,042,774 A | 3/2000 | Wilkening et al. | |
| 6,142,742 A * | 11/2000 | Krueger | C23C 14/564 417/48 |
| 8,895,893 B2 | 11/2014 | Perret et al. | |
| 2006/0003095 A1 | 1/2006 | Bullen et al. | |
| 2007/0180846 A1 * | 8/2007 | Kummeth | F25D 17/042 62/371 |
| 2007/0205720 A1 * | 9/2007 | Sparks | F04B 37/04 313/553 |
| 2008/0020245 A1 * | 1/2008 | Milacic | H01M 8/04097 429/415 |
| 2008/0175636 A1 | 7/2008 | Sakuraba et al. | |
| 2009/0104101 A1 * | 4/2009 | Weist | B01D 53/864 423/262 |
| 2011/0291331 A1 * | 12/2011 | Scott | B22F 3/1055 264/510 |
| 2013/0193620 A1 * | 8/2013 | Mironets | B23K 15/0086 264/401 |
| 2014/0178241 A1 * | 6/2014 | Mironets | B22F 1/0085 419/31 |
| 2014/0301883 A1 * | 10/2014 | Wiesner | B22F 3/1055 419/1 |

FOREIGN PATENT DOCUMENTS

| | | |
|---|---|---|
| JP | H03-159117 A | 7/1991 |
| JP | H04-156913 A | 5/1992 |
| JP | H06-346105 A | 12/1994 |
| JP | H07-031877 A | 2/1995 |
| JP | 2003-506207 A | 2/2003 |
| JP | 2006-124732 A | 5/2006 |
| JP | 2006-131921 A | 5/2006 |
| WO | 92/08592 A1 | 5/1992 |
| WO | 01/10548 A1 | 2/2001 |
| WO | 2010/007394 A1 | 1/2010 |
| WO | 2010/007396 A1 | 1/2010 |
| WO | 2014/071135 A1 | 5/2014 |

OTHER PUBLICATIONS

Feb. 4, 2016 International Search Report issued in International Patent Application No. PCT/EP2015/074261.

Feb. 4, 2016 Written Opinion of the International Searching Authority issued in International Patent Application No. PCT/EP2015/074261.

"GetterMax® 133," Research Catalysts, Inc. (Obtained Oct. 16, 2014).

"GetterMax® 233," Research Catalysts, Inc. (Obtained Oct. 16, 2014).

Artrip, David J., "Reduction Guidelines for Copper Catalysts," Catalysts for Science and Industry, Research Catalysts, Inc., Aug. 29, 2012.

Jul. 20, 2018 Office Action issued in Chinese Patent Application No. 201580069387.9.

* cited by examiner

ADDITIVE MANUFACTURING APPARATUS AND METHODS

FIELD OF INVENTION

This invention concerns additive manufacturing apparatus and methods in which material layers are solidified in a layer-by-layer manner to form an object. The invention has particular, but not exclusive application, to selective laser solidification apparatus, such as selective laser melting (SLM) and selective laser sintering (SLS) apparatus.

BACKGROUND

Selective laser melting (SLM) and selective laser sintering (SLS) apparatus produce objects through layer-by-layer solidification of a material, such as a metal powder material, using a high energy beam, such as a laser beam. A powder layer is formed across a powder bed in a build chamber by depositing a heap of powder adjacent to the powder bed and spreading the heap of powder with a wiper across (from one side to another side of) the powder bed to form the layer. A laser beam is then scanned across portions of the powder layer that correspond to a cross-section of the object being constructed. The laser beam melts or sinters the powder to form a solidified layer. After selective solidification of a layer, the powder bed is lowered by a thickness of the newly solidified layer and a further layer of powder is spread over the surface and solidified, as required. An example of such a device is disclosed in U.S. Pat. No. 6,042,774.

The process is carried out in an inert gas atmosphere because the metal powder is highly reactive with gases, such as oxygen. As described in International patent application No: 2010/007394, it is known to first form a vacuum in a build chamber and then refill the chamber with an inert gas in order to ensure low oxygen content in the resultant atmosphere. For example, using this technique, an oxygen content of the atmosphere in the chamber may be reduced as low as 1000 ppm. Over the course of the build, the oxygen content may drop further due to the remaining oxygen in the chamber being consumed as oxides in the part being formed. The amount of oxygen absorbed will depend on the material being used. For example, titanium is much more able to absorb oxygen than steel or aluminium. It is desirable to have a consistent oxygen content in the atmosphere throughout the build in order to achieve consistent build properties throughout the part.

It is believed that moisture in the air and the powder leads to hydrogen being absorbed into the material of the part, which results in hydrogen gas porosity in the part.

The presence of nitrogen in the inert atmosphere during a build may also be undesirable.

SUMMARY OF INVENTION

According to a first aspect of the invention there is provided an additive manufacturing apparatus comprising a chamber, a build platform movable in the chamber such that layers of flowable material can be successively formed across the build platform, a unit for generating an energy beam for solidifying the flowable material, a scanning unit for directing the energy beam onto selected areas of each layer to solidify the material in the selected areas and a getter for absorbing oxygen, nitrogen and/or hydrogen from atmosphere in the chamber.

The apparatus may comprise a gas recirculation circuit having an inlet and outlet connected to the chamber for recirculating gas through the chamber, wherein the gas recirculation circuit has the getter therein for absorbing oxygen, nitrogen and/or hydrogen from the recirculating gas.

The getter may allow the levels of oxygen, nitrogen and/or hydrogen to be reduced to lower levels than can be achieved through the conventional methods of degassing the build chamber and backfilling with an inert gas. Furthermore, the getter may ensure levels of oxygen, nitrogen and/or hydrogen remain substantially stable throughout a build.

The getter may be an oxygen getter, such as a copper based getter. Oxygen is often absorbed by the material during solidification, especially in the case of metals. Providing an oxygen getter may reduce the amount of oxygen absorbed by the material during solidification. In an alternative embodiment, the getter may be a titanium based getter.

The gas recirculation circuit may comprises valve(s) that can isolate the getter from atmosphere in the chamber. The getter can be permanently damaged through exposure to excessive levels of certain gases. Providing isolation valves allows the getter to be isolated from the atmosphere in the chamber until such gases are reduced to a level that is safe for the getter.

The chamber may comprise a door through which a part, built using the additive manufacturing apparatus, can be removed from the chamber and the valve(s) may be arranged to isolate the getter from the chamber when the door to the chamber is opened.

The additive manufacturing apparatus may comprise means for removing unwanted gases absorbed by the getter from the chamber, the valve(s) arranged to isolate the getter from the chamber whilst gases absorbed by the getter remain above a predetermined level.

The additive manufacturing apparatus may comprise means for regenerating the getter after use. It may desirable to regenerate to getter within the apparatus such that the getter does not need to be regularly removed from the apparatus. The means for regenerating the getter may comprise a heating element for heating gas that flows past the getter. The means for regenerating the oxygen getter may comprise a source of hydrogen gas.

The apparatus may comprise means for removing moisture, generated from the regeneration of the getter, from the apparatus. Regeneration of the getter may generate steam/ water as by-product, which it may be desirable to remove as it may be undesirable for such moisture to be present in the atmosphere of the chamber during a build.

The additive manufacturing apparatus may comprise a sensor for detecting a characteristic that is indicative of progress in the regeneration of the getter. The sensor may be a temperature sensor for monitoring a temperature of material of the getter, a moisture detector for detecting an amount of moisture in gases leaving the getter and/or a hydrogen sensor for detecting a concentration of hydrogen in gases leaving the getter.

DESCRIPTION OF EMBODIMENTS

Figure 1:
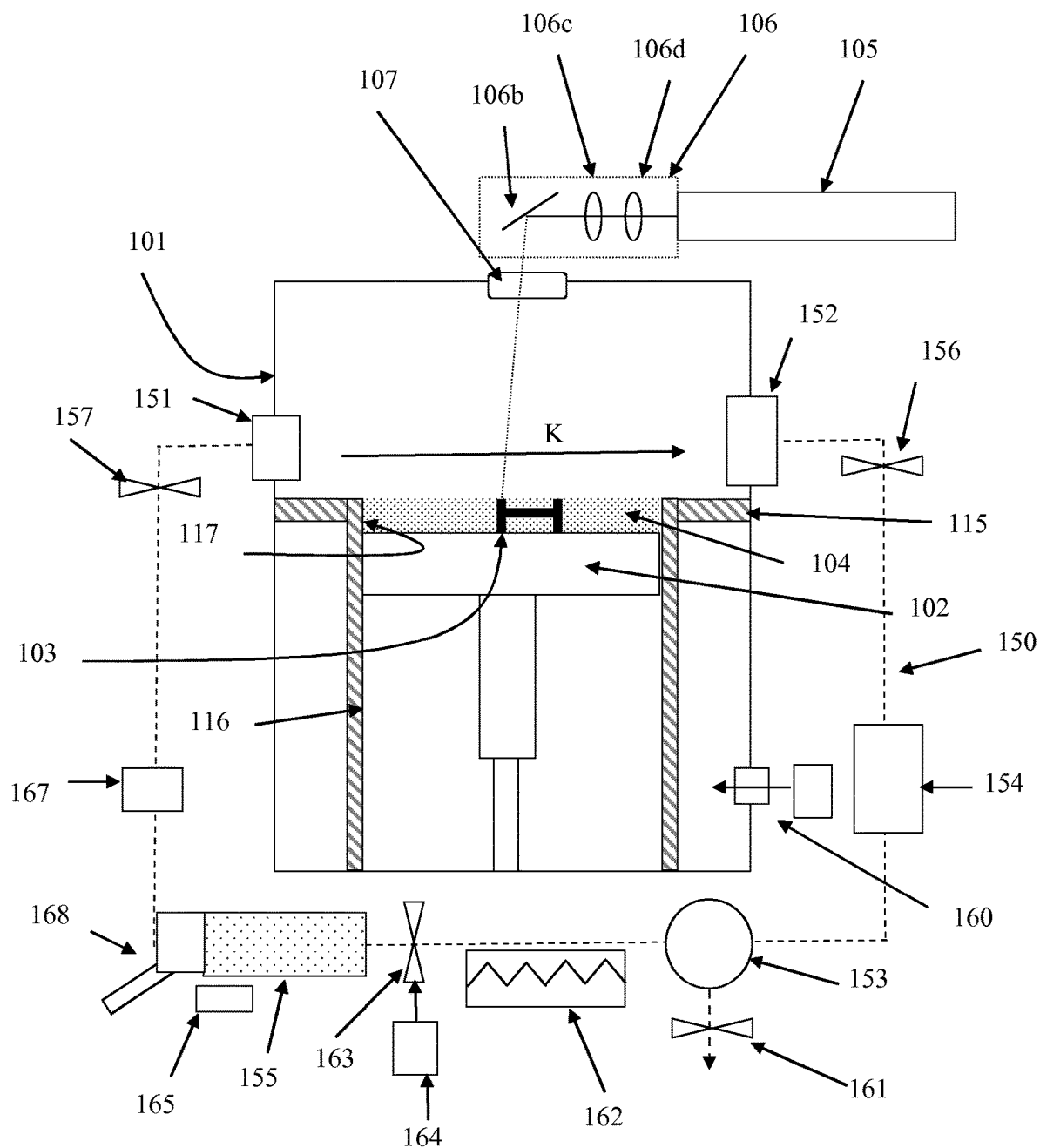
FIG. 1 is a schematic of a selective laser solidification apparatus according to an embodiment of the invention.
Figure 2:
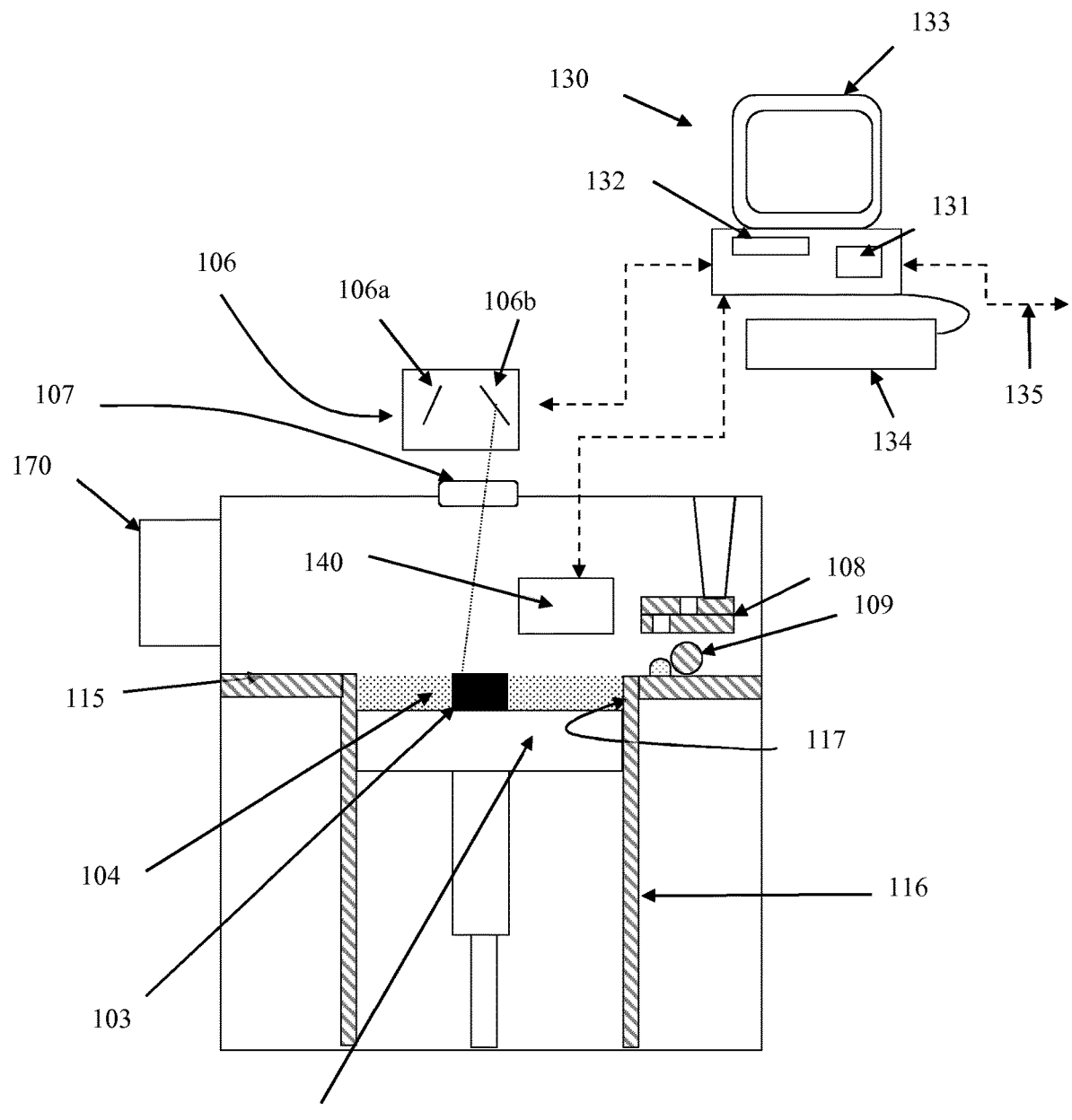
FIG. 2 is a schematic of the selective laser solidification apparatus from another side.

Referring to FIGS. 1 to 5, a laser solidification apparatus according to an embodiment of the invention comprises a main chamber 101 having therein partitions 115, 116 that define a build chamber 117 and a surface onto which powder can be deposited. A build platform 102 is provided for supporting an object 103 built by selective laser melting powder 104. The platform 102 can be lowered within the build chamber 117 as successive layers of the object 103 are formed. A build volume available is defined by the extent to which the build platform 102 can be lowered into the build chamber 117.

The main chamber 101 comprises a door 170 to allow access to the chamber 101 for removable of parts built using the apparatus.

Layers of powder 104 are formed as the object 103 is built by dispensing apparatus 108 and an elongate wiper 109. For example, the dispensing apparatus 108 may be apparatus as described in WO2010/007396.

A laser module 105 generates a laser for melting the powder 104, the laser directed as required by optical scanner 106 under the control of a computer 130. The laser enters the chamber 101 via a window 107.

The optical scanner 106 comprises steering optics, in this embodiment, two movable mirrors 106a, 106b for directing the laser beam to the desired location on the powder bed 104 and focussing optics, in this embodiment a pair of movable lenses 106c, 106d, for adjusting a focal length of the laser beam. Motors (not shown) drive movement of the mirrors 106a and lenses 106b, 106c, the motors controlled by processor 131.

Computer 130 comprises the processor unit 131, memory 132, display 133, user input device 134, such as a keyboard, touch screen, etc, a data connection to modules of the laser melting unit, such as optical module 106 and laser module 105, and an external data connection 135. Stored on memory 132 is a computer program that instructs the processing unit to carry out the method as now described.

Processor receives via external connection 135 geometric data describing scan paths to take in solidifying areas of powder in each powder layer. To build a part, the processor controls the scanner 106 to direct the laser beam in accordance with the scan paths defined in the geometric data. In this embodiment, to perform a scan along a scan path, the laser 105 and scanner 106 are synchronised to expose a series of discrete points along the scan path to the laser beam. For each scan path, a point distance, point exposure time and spot size is defined. In an alternative embodiment, the spot may be continuously scanned along the scan path. In such an embodiment, rather than defining a point distance and exposure time, a velocity of the laser spot may be specified for each scan path.

The apparatus further comprises a gas recirculation circuit 150 and an inlet 160 for backfilling the chamber 101 with inert gas, such as nitrogen or argon.

Gas recirculation circuit 150 comprises an inlet 151 and outlet 152 connected with the main chamber 101 and a pump 153 for recirculating gas through the gas recirculation circuit 150 and main chamber 101 to generate a gas knife, K, across the powder bed 104 for removing condensate generated during the melting process. The pump 153 is also connectable to a degassing valve 161 to allow the pump 153 to degas chamber 101 to a rough vacuum. The gas recirculation circuit 150 further comprises a filter 154 for removing particles from the recirculating gas and an oxygen getter 155.

In this embodiment, the oxygen getter 155 comprises a copper based oxygen getter, such as the catalyst GetterMax 133 or 233 supplied by Research Catalysts Inc. The recirculated gas is pumped past the material of the oxygen getter 155 as it is recirculated. The copper based oxygen getter absorbs oxygen through the formation of copper oxide.

The recirculation circuit 150 comprises a heating element 162 for heating gas transported in the recirculation circuit 150 and a valve 163 connectable to a source 164 of hydrogen gas, the valve 163 controllable to control a quantity of hydrogen gas allowed into the recirculation circuit 150. One or more temperature monitors, such as thermocouples 165, monitor the temperature of the oxygen getter 155, a moisture content sensor 166 monitors the moisture content of gas leaving the oxygen getter 155 and a hydrogen gas sensor 167 monitors the quantity of hydrogen in the gas leaving the oxygen getter 155. A means 168 may be provided for condensing and removing water from the oxygen getter 155.

In use, before a build, the chamber 101 is degassed to a vacuum and then backfilled via inlet 160 with an inert atmosphere, such as argon or nitrogen. The build is carried out under the inert atmosphere with gas being recirculated via the recirculation circuit 150 during the build to form gas knife, K. Oxygen remaining in the atmosphere is absorbed by the oxygen getter 155. To this end, the inert gas may be recirculated for a set period of time before the build commences such that oxygen in the atmosphere is reduced to a desired low level through absorption of the oxygen by the getter 155 before the build commences.

To regenerate the oxygen getter, for example at the end of each build, the oxygen getter 155 must be activated by reduction. In one embodiment, reduction of the getter may be carried out external to the apparatus by removal of the oxygen getter from the apparatus. However, in this embodiment, activation of the oxygen getter is carried out in the gas recirculation circuit 150.

Regeneration of the oxygen getter 155 may comprise heating an inert, hydrogen free gas, such as nitrogen or argon, flowing though the getter 155 with the heating element 162 such that the material bed of the oxygen getter 155 is at a desired temperature, such as between 175 to 180° C. The temperature of the oxygen getter 155 may be monitored by the thermocouples 165.

Once the catalyst has been heated for a predetermined length of time, such as 2 hours, hydrogen is introduced into the gas in the recirculation circuit through valve 163, whilst maintaining the temperature of the gas flowing onto the getter 155 at the desired temperature. The temperature of the oxygen getter 155 will increase as the hydrogen in the gas reacts with the oxygen. The temperature rise in the oxygen getter 155 may be monitored using the thermocouple 165. If the temperature of the oxygen getter 155 exceeds a predetermined value, such as 225° C., the gas flowing through the oxygen getter 155 is switched back to hydrogen free gas.

Completion of the activation process may be determined from any one or more of the thermocouple 165, the moisture sensor 166 and the hydrogen gas sensor 167. Completion of the activation process may be determined from:

a) A stable temperature of the material bed of the oxygen getter;
b) Stoppage of the formation of water; and/or
c) The concentration of hydrogen in the gas leaving the oxygen getter 155 equaling the concentration of hydrogen in the gas entering the oxygen getter 155.

Water generated as a result of the activation process may be removed by means 168.

After activation, the recirculation circuit 150 may be purged with the hydrogen free inert gas, such as argon or nitrogen, to ensure the recirculation circuit 150 is free from hydrogen.

The recirculation circuit 150 further comprise valves 156 and 157 for isolating the gas recirculation circuit 150 from the build chamber 101 when door 170 is opened. Sensors (not shown) may be provided for detecting if the door is opened such that the valves 156, 157 can be automatically activated by the processor when opening of the door is detected. With the oxygen getter in the activated state, exposure to air can cause the oxygen getter to heat up sufficiently to permanently damage the oxygen getter 155.

In another embodiment, in addition to or instead of the oxygen getter, the apparatus comprises a hydrogen or nitrogen getter.

The invention claimed is:

1. An additive manufacturing apparatus, comprising:
a chamber;
a build platform movable in the chamber such that layers of flowable material can be successively formed across the build platform;
a laser for generating a laser beam for solidifying the flowable material;
an optical scanner configured to direct the laser beam onto selected areas of each layer to solidify the flowable material in the selected areas;
a getter for absorbing oxygen, nitrogen and/or hydrogen from atmosphere in the chamber; and
a gas recirculation circuit having (i) an inlet and outlet connected to the chamber and (ii) a pump for recirculating gas around the recirculation circuit including through the chamber,
wherein the additive manufacturing apparatus is configured to activate the pump to recirculate gas using the gas recirculation circuit past the getter for a set period before a build commences such that oxygen, nitrogen and/or hydrogen in the recirculating gas is absorbed by the getter.

2. The additive manufacturing apparatus according to claim 1, wherein the getter is an oxygen getter.

3. The additive manufacturing apparatus according to claim 2, wherein the oxygen getter is a copper based getter.

4. The additive manufacturing apparatus according to claim 1, wherein the gas recirculation circuit has the getter therein for absorbing oxygen, nitrogen and/or hydrogen from the recirculating gas.

5. The additive manufacturing apparatus according to claim 4, wherein the gas recirculation circuit comprises valve(s) that can isolate the getter from atmosphere in the chamber.

6. The additive manufacturing apparatus according to claim 5, wherein the chamber comprises a door through which a part, built using the additive manufacturing apparatus, can be removed from the chamber and the valve(s) are arranged to isolate the getter from the chamber when the door to the chamber is opened.

7. The additive manufacturing apparatus according to claim 5, comprising means for removing unwanted gases absorbed by the getter from the chamber, the valve(s) being arranged to isolate the getter from the chamber whilst gases absorbed by the getter remain above a predetermined level.

8. The additive manufacturing apparatus according to claim 1, comprising means for regenerating the getter after use.

9. The additive manufacturing apparatus according to claim 8, wherein the means for regenerating the getter comprises a heating element for heating gas that flows past the getter.

10. The additive manufacturing apparatus according to claim 8, wherein the getter is an oxygen getter, and wherein the means for regenerating the oxygen getter comprises a source of hydrogen gas.

11. The additive manufacturing apparatus according to claim 8, comprising a sensor for detecting a characteristic that is indicative of progress in the regeneration of the getter.

12. The additive manufacturing apparatus according to claim 11, wherein the getter is an oxygen getter, and wherein the sensor is (i) a temperature sensor for monitoring a temperature of material of the getter, (ii) a moisture detector for detecting an amount of moisture in gases leaving the getter and/or (iii) a hydrogen sensor for detecting a concentration of hydrogen in gases leaving the getter.

13. An additive manufacturing method in which material layers are solidified in a layer-by-layer manner to form an object, the method comprising:
before a build of the object, forming an inert atmosphere in a chamber; and
carrying out the build of the object under the inert atmosphere by successively
(i) forming layers of flowable material across a movable build platform,
(ii) generating a laser beam for solidifying the flowable material, and
(iii) directing the laser beam with an optical scanner onto selected areas of each layer to solidify the flowable material in the selected areas,
wherein forming the inert atmosphere comprises activating a pump to recirculate gas through a gas recirculation circuit including through the chamber and past a getter for a set period before the build commences such that oxygen, nitrogen and/or hydrogen in the recirculating gas is absorbed by the getter.

14. The additive manufacturing method according to claim 13, wherein the getter is an oxygen getter.

15. The additive manufacturing method according to claim 13, wherein the getter is a copper or titanium based getter.

16. The additive manufacturing method according to claim 13, further comprising, during the build, recirculating gas through the chamber using the gas recirculation circuit to generate a gas knife across a bed of the layers of flowable material for removing condensate generated by melting of the material with the laser beam and removing the condensate from the recirculating gas using a filter.

* * * * *